(12) United States Patent
Sakaguchi

(10) Patent No.: US 6,455,792 B1
(45) Date of Patent: Sep. 24, 2002

(54) STEERING WHEEL WITH A MOVING CONTACT

(75) Inventor: Takashi Sakaguchi, Mömbris (DE)

(73) Assignee: Takata-Petri AG, Aschaffenburg (DE)

(*) Notice: Subject to any disclaimer, the term of this patent is extended or adjusted under 35 U.S.C. 154(b) by 0 days.

(21) Appl. No.: 09/806,912

(22) PCT Filed: Oct. 13, 1999

(86) PCT No.: PCT/DE99/03311

§ 371 (c)(1),
(2), (4) Date: Aug. 28, 2001

(87) PCT Pub. No.: WO00/23312

PCT Pub. Date: Apr. 27, 2000

(30) Foreign Application Priority Data

Oct. 15, 1998 (DE) .......................... 298 19 044

(51) Int. Cl.[7] .............................. B62D 1/04; B60R 16/00
(52) U.S. Cl. ..................................... 200/61.55; 280/731
(58) Field of Search ............................... 280/731, 728.2; 200/61.55, 61.54

(56) References Cited

U.S. PATENT DOCUMENTS

| | | | |
|---|---|---|---|
| 5,738,369 A | 4/1998 | Durrani | 280/731 |
| 5,801,349 A | 9/1998 | Komiya et al. | 200/61.55 |

FOREIGN PATENT DOCUMENTS

| | | |
|---|---|---|
| DE | 41-40-275 | 6/1992 |
| DE | 197-42-587 | 4/1998 |
| DE | 196-53-684 | 6/1998 |
| DE | 298-19-044 | 2/1999 |
| JP | 10-166983 | * 6/1998 |

* cited by examiner

Primary Examiner—Peter C. English
(74) Attorney, Agent, or Firm—Foley & Lardner

(57) ABSTRACT

The invention relates to a steering wheel with a moving contact that is elastically mounted and can move in the direction of the longitudinal axis of the steering column, especially to activate the horn. According to the invention, the steering wheel skeleton consists of at least one holder for engagement with at least one section (19,20) of the moving contact (18), and the moving contact (18) can be blocked in said position of engagement by at least one section (8) of the moving contact (18).

8 Claims, 3 Drawing Sheets

STEERING WHEEL WITH A MOVING CONTACT

BACKGROUND OF THE INVENTION

The invention relates to a steering wheel with a moving contact.

Steering wheels with moving contacts for actuation of a horn in motor vehicles are known. The moving contact in known steering wheels is connected at each of a number of points by a compression spring and a bolt to the steering wheel skeleton, so that it is movable in the direction of the longitudinal axis of the steering column, that is to say it has a floating support. By depressing the moving contact against the action of the compression springs the horn contacts are closed. For its actuation, the moving contact is generally connected to the covering cap for the airbag arranged in the steering wheel on the moving contact, so that the horn is actuated by depressing the covering cap.

The disadvantage of this arrangement is that the use of bolts to fix the moving contact gives rise to unwelcome material and assembly costs.

SUMMARY OF THE INVENTION

The object of the invention is to reduce the material and assembly costs of supporting a moving contact on the steering wheel.

In a steering wheel with moving contact, which is spring-supported and movable in the direction of the longitudinal axis of the steering column, especially for actuation of the horn, the steering wheel skeleton has at least one mount for the engagement of at least one section of the moving contact and the moving contact can be locked in the engaged position by at least one section of the moving contact.

The advantage of this method of fixing the moving contact is that no bolts or screws are required for fixing the moving contact, fixing instead being achieved through this assembly itself by slight modifications to the steering wheel skeleton and to the moving contact.

The mount is preferably of pocket-shaped design, the space between a spoke foot and a projection on the associated spoke in particular serving as the said pocket.

In one embodiment three mounts are arranged so that they form the angles of a triangle.

For locking the moving contact, a ramp is preferably arranged on the steering wheel skeleton, to which ramp a deformable locking part on the moving contact is assigned, the said locking part, in the locking position, being movable along the ramp in the direction of the longitudinal axis of the steering column. The locking part is deformable and preferably plastically deformable for shifting it into the locking position. The locking part ensures that the moving contact is fixed to the steering wheel skeleton.

A further embodiment provides for plastic coating of the engagement sections and the locking part. This coating on the one hand serves as electrical insulation and on the other hand ensures quiet movement of the locking part along the ramp.

For sprung support of the moving contact, a compression spring is in one embodiment provided between the said contact and the steering wheel skeleton in the area of each mount, the compression springs, preferably being arranged as cylindrical or helical coil springs around the contacts of the moving contact and assigned opposing contacts of the steering wheel skeleton.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
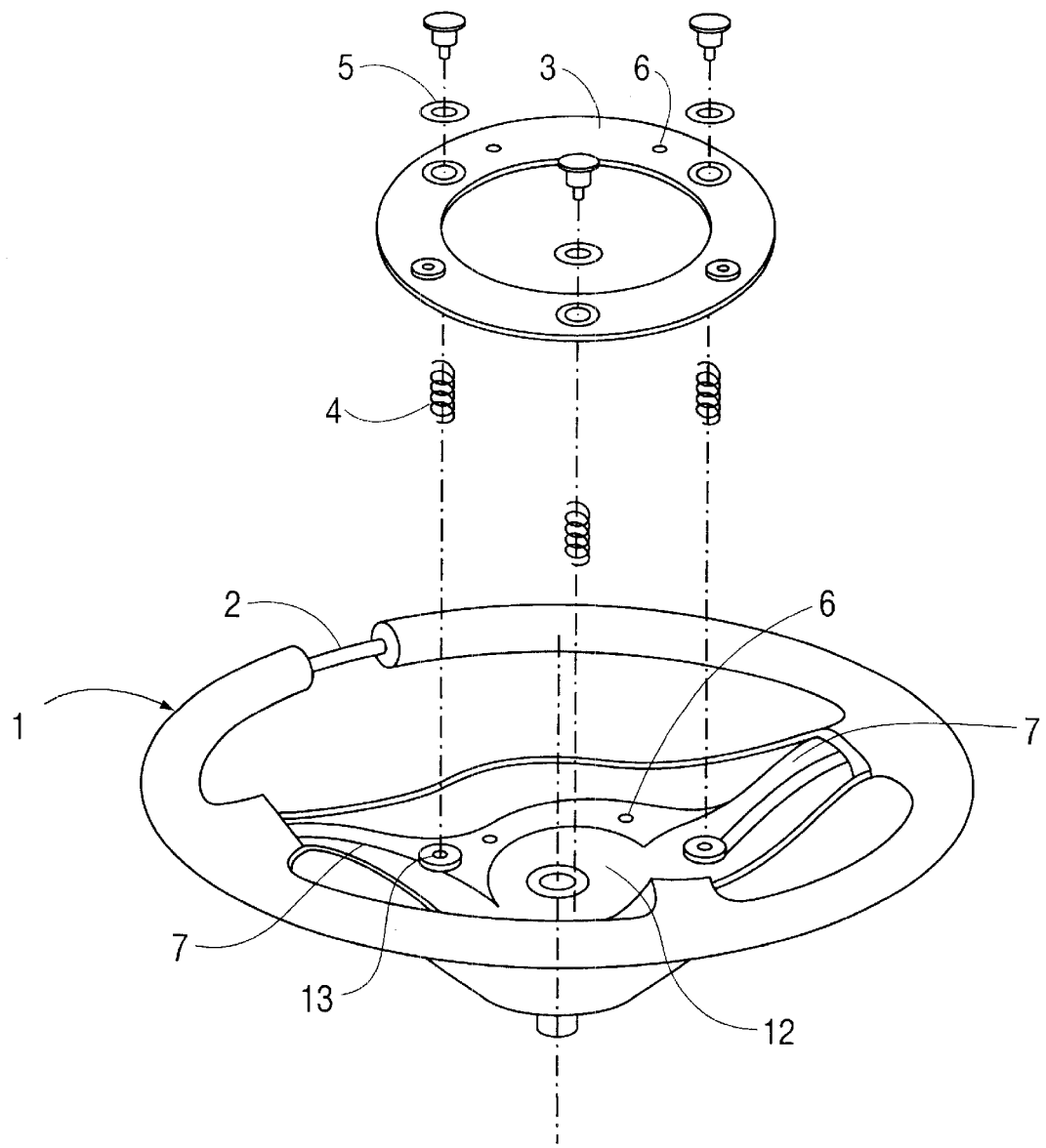
FIG. 1 shows an airbag steering wheel with a known method of fixing a moving contact to the steering wheel skeleton.

FIG. 1 represents a known method of fixing a moving contact 3 to an airbag steering wheel 1. The airbag steering wheel 1 has a steering wheel skeleton, which comprises a steering wheel rim 2, spokes 7 and a center area 12 of the steering wheel skeleton. The moving contact 3 is connected to the center area 12 of the steering wheel skeleton by means of three bolts 5 with intermediate insertion of compression springs 4. In so doing the bolts 5 are only screwed into holes 13 to a depth such that contact rivets 6 of the moving contact 3 and of the center area 12 of the steering wheel skeleton do not touch one another. The contacts are closed for actuation of the horn only by depressing the moving contact against the action of the compression springs 4.

For this purpose the moving contact 3 is connected to a covering cap (not shown) for the airbag (likewise not shown). The driver therefore actuates the moving contact by depressing the covering cap.

Figure 2:
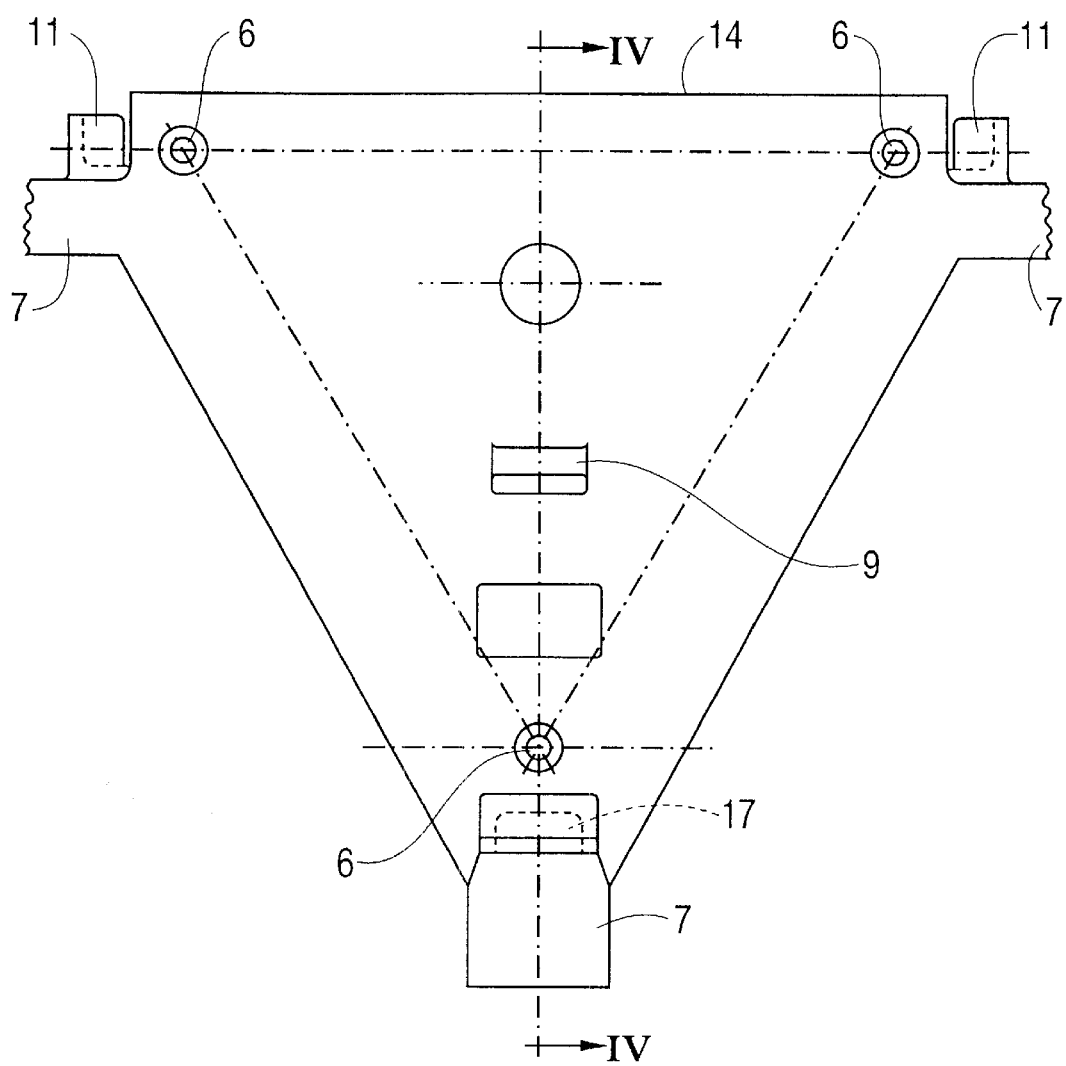
FIG. 2 shows the center area of a steering wheel skeleton modified according to the invention.
Figure 4:
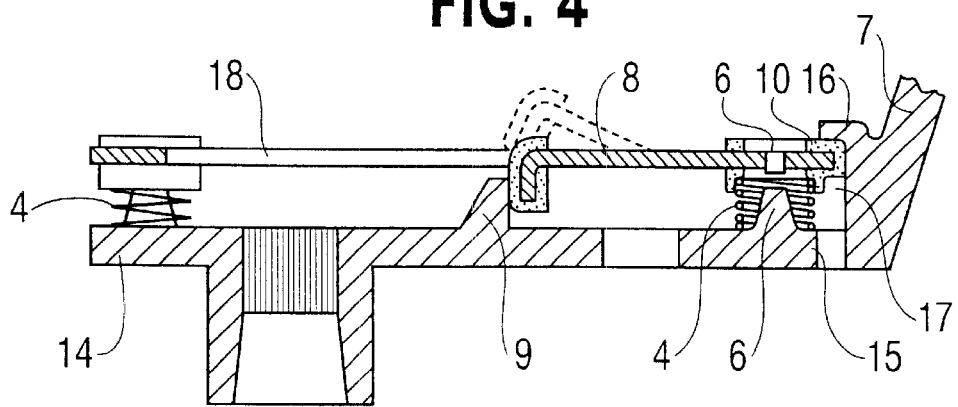
FIG. 4 shows a section IV—IV through FIGS. 2 and 3 with the steering wheel skeleton and the moving contact in the assembled state.

The center area 14 of the steering wheel skeleton modified according to the invention and represented in FIG. 2 has two pockets 11 and a broader pocket 17, which is formed by a space between the foot 15 of each spoke 7 and a projection 16 of each spoke 7 (FIG. 4). In addition a ramp 9 and contacts 6 are provided.

Figure 3:
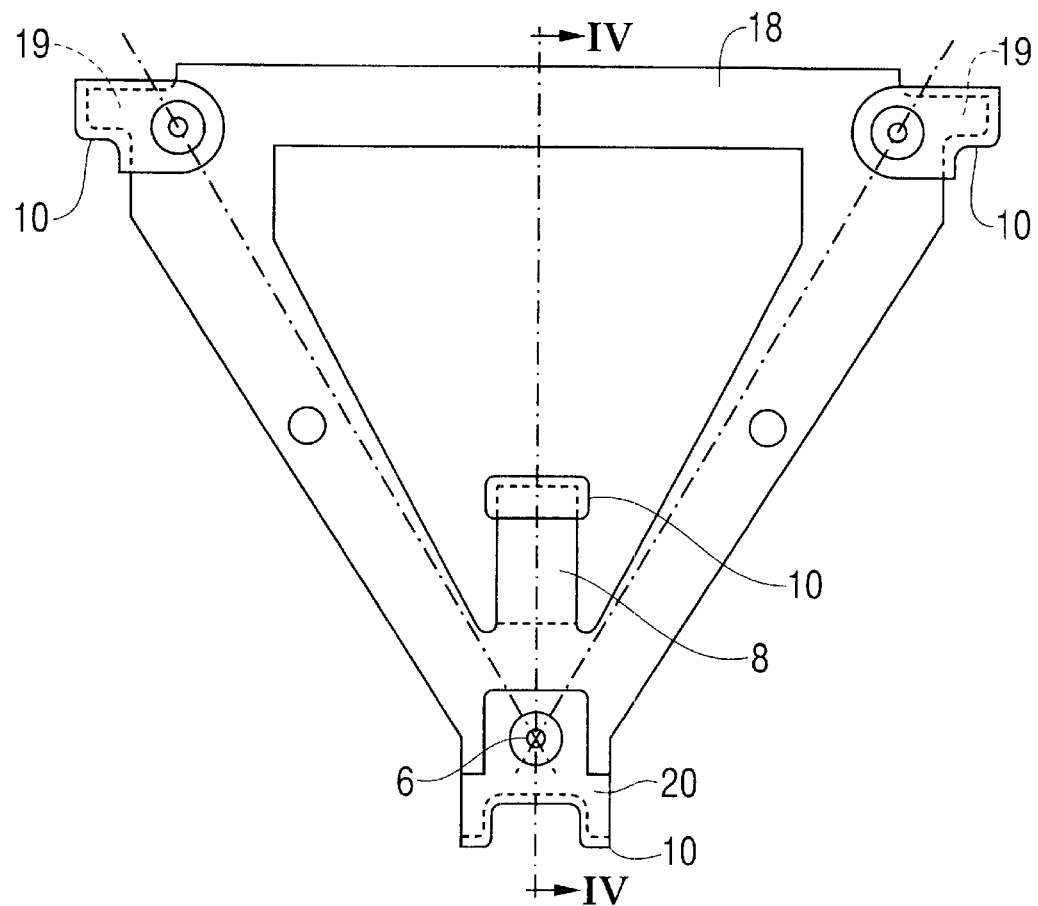
FIG. 3 shows a moving contact modified according to the invention.

A moving contact 18 according to the invention, which is assigned to the center area 14 of the steering wheel skeleton, is represented in FIG. 3. The moving contact 18 has two sections 19, which are assigned to the pockets 11, and a section 20, which is assigned to the pocket 17. The moving contact 18 furthermore has a plastically deformable locking part 8, which is assigned to the ramp 9 of the center area 14. The sections 19, the section 20 and the locking part 8 are at least partially enclosed by a plastic coating 10.

FIG. 4 shows the center area 14 of the steering wheel skeleton and the moving contact 18 in the assembled state. The moving contact 18 is inserted into the pockets 11 and the pocket 17 from the side with the intermediate insertion of cylindrical compression springs 4. In this process the locking part 8 is in the position represented by dashed lines in FIG. 4. On reaching the limit position, the locking part 8 is pressed behind the ramp 9, as is also represented in FIG. 4. The moving contact 18 can thereby no longer be pushed back out of the steering wheel skeleton. In the rest position the sections 19 and the section 20 of the moving contact 18 are pressed against the projections 16 of the steering wheel skeleton by the compression springs 4, and the contacts 6 are situated opposite with a gap. When the moving contact 18 is depressed the locking part 8 also slides downwards along the ramp 9. This movement is facilitated by the plastic coating 10.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A steering wheel assembly including a steering column, the assembly comprising:
   a contact for actuating a horn, the contact being spring-supported and movable in the direction of the longitudinal axis of the steering column;
   a steering wheel skeleton having at least one mount engaging the contact and limiting movement of the contact away from a central portion of the skeleton;
   wherein the skeleton includes a ramp section and the contact includes a deformable locking part engaged with the ramp section; and
   wherein the locking part is movable along the ramp section in the direction of the longitudinal axis of the steering column.

2. The assembly of claim 1, wherein the mount is pocket shaped.

3. The assembly of claim 2, wherein the skeleton includes a plurality of spokes, and wherein each spoke includes a foot section that connects to the foot sections of the other spokes at a center area and wherein each spoke includes a projection positioned above the respective foot section; and wherein the mount comprises a plurality of mounting pockets formed under the projection of each of the spokes.

4. The assembly of claim 3, wherein the mounting pockets are positioned in a triangular spaced apart relationship.

5. The assembly of claim 1, wherein the locking part is plastically deformable.

6. The assembly of claim 1, wherein the locking part and other portions of the contact are coated with plastic.

7. The assembly of claim 1, further comprising a compression spring positioned at the mount for providing spring support for the contact.

8. The assembly of claim 7, wherein the compression spring is a coil spring positioned around a contact point on the moving contact and a corresponding contact point on the skeleton.

* * * * *